United States Patent [19]

Pohl

[11] 4,376,047
[45] Mar. 8, 1983

[54] COATED RESIN ION EXCHANGE COMPOSITION

[75] Inventor: Christopher A. Pohl, Hayward, Calif.

[73] Assignee: Dionex Corporation, Sunnyvale, Calif.

[21] Appl. No.: 275,109

[22] Filed: Jun. 18, 1981

[51] Int. Cl.$^3$ .............................................. B03B 5/60
[52] U.S. Cl. .................................. 210/198.2; 428/402; 428/327; 428/332; 210/502; 521/28
[58] Field of Search ...................... 428/402, 327, 332; 210/656, 635, 198.2, 502; 521/28

[56] References Cited

U.S. PATENT DOCUMENTS 4,252,644 2/1981 Small et al. ..................... 210/656

Primary Examiner—George F. Lesmes
Assistant Examiner—Beverly K. Johnson
Attorney, Agent, or Firm—Flehr, Hohbach, Test, Albritton & Herbert

[57] ABSTRACT

An ion exchange composition formed of insoluble synthetic resin support particles with ion exchange sites at their exposed surfaces, and fine synthetic resin layering particles with ion exchange sites on their exposed surfaces, which attract the ion exchange sites of the support particles so that the layering particles are irreversibly attached as a monolayer to the support particles. The layering particles have a median diameter ranging from 0.002 to 0.09 microns, while the ratio of median diameters of the support particles to layering particles range from 100 to 1, and 5000 to 1. The composition is packed into a column and is used for separation of ions in liquid ion exchange chromatography.

6 Claims, No Drawings

COATED RESIN ION EXCHANGE COMPOSITION

BACKGROUND OF THE INVENTION

The present invention relates to a composition which is useful for performing liquid ion exchange chromatography in a packed column.

In Small et al U.S. Pat. No. 4,101,460, a high performance ion exchange composition is described which includes Component A, an insoluble synthetic resin substrate, having ion exchange sites on at least its available surface, and Component B, a finely divided synthetic resin particle of 0.1 to 5 microns median diameter, having ion exchange sites on their outer surfaces. Component B is irreversibly attached as a monolayer to Component A. While the lower limit of disclosed median diameter of Component B is 0.1 micron, the actual lowest median diameter disclosed in the examples is 0.6 micron. Referring to Tables II and III on columns 15 and 16 of the patent, the chromatographic separations with compositions of four different Component B median diameters are compared. The true resolution time ($T_2$) illustrated in Table 3, decreases with a decrease in the median diameter down to a minimum at a median diameter of 0.95, but thereafter increases with a median diameter of 0.6. At column 16, lines 61–63, the best performing packing is stated to be the one which shows the shortest true resolution time, and so the packing with the Component B median diameter 0.95 is stated to be superior to one with a 0.6 micron median diameter. From this, it is logical to conclude that performance is optimized at a Component B median diameter above 0.6 micron.

Referring again to U.S. Pat. No. 4,101,460, at column 4, lines 15–25, it is stated that the composition may be varied by varying the size of Component B, specifically that the particle sizes with a large medium diameter produce an ion exchange composition with high capacity and low performance, relative to an ion exchange composition prepared from a particle sample with a relatively smaller mean diameter. There is no suggestion of any benefit to be obtained by the use of differently sized Component A particles.

SUMMARY OF THE INVENTION

In accordance with the present invention, synthetic resin support particles with ion exchange sites at their exposed surfaces are coated with fine synthetic resin layering particles with ion exchange sites on their exposed surfaces, which attract the ion exchange sites of the support particles. In this manner, the layering particles are irreversibly attached as a monolayer to the support particles.

The sizing of the support particles and layering particles is an important part of the present invention. Preferably, the layering particles have a median diameter ranging from 0.002 to 0.08 micron, while the ratio of median diameters of support particles to layering particles ranges between 100 to 1, and 5000 to 1. The use of these extremely fine layering particles, below that employed in the above prior art compositions, in combination with the use of smaller substrate particles, produces an optimum combination of increased efficiency without increasing the capacity of the column. It is particularly important for certain chromatographic separations that the improvement in efficiency caused by the use of smaller support particles not be accompanied by an increased capacity, which would occur if the layering particles were maintained at a constant size. The advantages of simultaneously reducing the size of the layering particles and the support particles include a high degree of flexibility in flow rates, resolution, and resolution time, due to the high efficiency of such a column.

DETAILED DESCRIPTION OF THE INVENTION

The ion exchange composition of the present invention includes synthetic resin support particles with ion exchange sites at their exposed surfaces, to which fine synthetic resin layering particles with ion exchange sites on their exposes surfaces, are irreversibly attached by attraction of the respective ion exchange sites. The present description will refer first to the support particles.

The support particles may be formed from the same type of synthetic resin used for the present support particles as described under the heading Substrate and designation Component B in the aforementioned U.S. Pat. No. 4,101,460, incorporated herein by reference.

The substrate particles may be sized with a median diameter between 3 microns and 100 microns, and preferably 3 microns and 25 microns. In general, smaller substrate particles lead to higher chromatographic efficiencies.

An important aspect of the invention is that the ratio of median diameters of the support particles to layering particles is maintained within a predetermined range, preferably ranging between 100 to 1, and 5000 to 1. A preferred ratio of median diameters of support particles to layering particles ranges between 200 to 1, and 2000 to 1. Insert above: In accordance with the invention, the substrate particles may be relatively nonporous, or substantially porous, such as of the type known as "macroreticular", or "macroporous" resin.

The layering particles include ion exchange sites on their exposed surfaces, which are attracted to the corresponding sites on the support particles to form a monolayer. Such layering particles are formed from synthetic resin, suitably of a type described in U.S. Pat. No. 4,101,460 under the heading Monolayer and designation "Component B".

An important feature of the present invention is that the layering particles are substantially smaller in size from those described in the aforementioned prior art. Specifically, such layering particles have a median diameter ranging from 0.002 to 0.08 micron, and preferably from 0.007 to 0.05 micron. The significance of this smaller size layering particle is subtle, but profound, in terms of the results achieved. In effect, the invention deviates from any suggestion of the aforementioned patent, by reducing the layering particle size below the lower limit set forth in that patent (0.1 micron). This lower limit flies in the face of experimental results in the patent that indicate a better performing packing at a median diameter of 0.95 micron than at 0.6 micron, which would lead one in the direction of not reducing the diameter below 0.6 microns, and certainly not to the range of the present invention, with a maximum size of 0.08 micron.

It is typical to use estimates for the extremely small size of the layering particles. In one technique, the functional property, such as the $K'$ for sulfate in an ion exchange run, is compared to a similar value for a known layering particle, with other parameters being constant. The $K'$ values are directly proportional to the diameter of the layering particles. This approach has been confirmed by scanning electron microscope studies. Other estimating techniques are set forth in U.S. Pat. No. 4,101,460.

It has been found that a reduction of the size of the substrate particles improves the efficiency of chromatographic separation with the resin. However, if the layering particles are maintained at a constant size, the capacity of the column increases to a point where it would have a detrimental effect on use in a system such as set forth in Small et al U.S. Pat. No. 3,920,397. Briefly summarized, that system relates to a first chromatographic separation column, followed by a stripper column which removes the chromatography developing reagent in ionized form, so that the ions of interest may be measured by a conductivity meter without interference from the developing reagent. For this type of separation, the separator column must have a low capacity so that the stripper column is capable of a useful lifetime. The solution to the problem of increasing chromatographic efficiency, without unduly increasing capacity, is to reduce simultaneously the size of the layering particles and the substrate particles. The flexibility achieved by this approach is extraordinary. For example, for a difficult separation where the prime objective is to achieve sharper peaks, and therefore a higher resolution, one can reduce the substrate and layering particles in the above ranges, with identical flow rates and resolution times. If one wishes to maintain the same resolution, but to reduce the run time, one could employ a faster flow rate with the composition of the present invention, because of the greater efficiency of such particles.

Various techniques could be employed to form the ion exchange composition of the present invention. For example, a liquid suspension of layering particles may be contacted with substrate particles. Suitable techniques are set forth in Small et al U.S. Pat. No. 4,101,460, and in Smith, Jr. et al U.S. Pat. No. 4,119,580.

The above compositions are particularly useful as packing materials for columns to be used in ion exchange chromatography. There, a mixture of ions is resolved by passing through the column, wherein the different ions are separated due to different degrees of attraction by the ion exchange sites on the packing material. To remove the ions from the column, an eluent, also attracted by such sites, is passed through the column to drive the ions so that they may be collected for analysis. Such eluents typically are of the same charge as the ions to be resolved, and of a different chemical type.

Similar to the compositions of U.S. Pat. No. 4,101,460, the ion exchange compositions of the present invention are particularly useful for high performance chromatography, as defined therein, and are, in fact, more efficient than the compositions of that patent.

The ranges of eluents to be employed, their flow rates and other parameters of the ion exchange chromatography, are well known to those of skill in the art. The ability to use the increased chromatographic efficiency of the composition of the present invention will also be apparent to a skilled worker in the field.

A further disclosure of the nature of the present invention is provided by the following specific examples of its practice. It should be understood that the data disclosed serve only as examples and are not intended to limit the scope of the invention.

In the following examples, the sizes of the support particles were determined by optical microscopy. The sizes were varied by variation of the speed of stirring during suspension polymerization.

In each instance, the support particles were formed of 25 micron median diameter surface sulfonated styrene-divinylbenzene resin beads of the desired particle size, suitably formed in accordance with the method described by Small in *Jour. Inorg. Nucl. Chem.*, 18:232 (1961).

Layering particles were in a latex form, at an appropriate concentration of 2%, of a type such as described in the aforementioned U.S. Pat. No. 4,101,460. The size of such particles were reduced to the desired size by techniques which are well known to those skilled in the art of emulsion polymerization. In one technique, the organic monomer phase concentration may be reduced to reduce the particle size. Thus, for example, an 0.0075 micron particle size may be formed with a 1% monomer phase as set forth in Example 2. The determination of the size of such layering particles was performed indirectly by comparison to a known particle size. That is, a K' value for sulfate for the packing of the present invention, with unknown layering particle size, is compared with the K' value for a known layering particle size. It has been established that the K' value is directly proportional to the size of the layering particles, and so the ratio of the K' value for the known particle size, to that of the unknown particle size, indirectly provides the particle size of the unknown particles.

The procedure of layering, or coating, the layering particles onto the support particles is as follows. 1 ml of latex, including the concentration of 2% particles dispersed in water, and including a surfactant, was in turn dispersed in 60 ml of 0.1 M sodium chloride. Surface sulfonated resin (7 grams), with 2% cross-linking of the desired size, was dispersed in 40 ml of 0.1 M sodium chloride. The resin slurry was added slowly to the latex dispersion while it was being stirred at high speed. After the addition of resin was completed, the mixture was stirred at high speed for 30 minutes. Thereafter, the agglomerated resin was packed by placing in a 100 ml packing reservoir, and packed into a 4×250 mm plastic column at 8 ml/minute flow rate while the slurry was being stirred.

In each instance, the chromatographic separation column employed was a 4×250 mm column packed with resin of the foregoing type. The outlet of the column was connected to the inlet of another column (60×60 mm) which contained a packing of high capacity anion resin in hydrogen ion form. The outlet of the second column was then connected to a conductivity cell-conductivity meter-recorder combination to measure the conductivity of the effluent stream passing from the second column. Chromatograms were formed by the recorder.

Four such different sized latexes are designated Latex A, B, C and D. The K' sulfate values are: A—7.4; B—2.27; C—1.63; and D—3.6. Normalizing the K' values so that the K' value for the control latex A is 1.0, the K' values of the other latexes are as follows: for Latex B—0.31; for Latex C—0.22; and for Latex D—0.49. The latex size of control Latex A is 0.15 micron, and so the estimated size of the smallest latex, Latex C, is 0.033 microns.

EXAMPLE 1

A standard anion mixture (3 ppm fluoride, 4 ppm chloride, 10 ppm nitrite, 50 ppm phosphate, 30 ppm nitrate, 10 ppm bromide, and 50 ppm sulfate) was directed through the system with an eluent comprising aqueous solution of 2.4 mM sodium carbonate, and 3.0 mM sodium bicarbonate.

The results of the tests showed a sulfate retention time for Latex A of 7.4 minutes, and for Latex C of 1.9 minutes. This substantial reduction in retention time decreases the time necessary for the run, an important consideration in any chromatographic measurement. In addition, it also decreases a required amount of eluent, which must be stripped in the suppressor column during the performance of ion chromatography. In other words, it is critical to that application that a relatively low capacity separation column be employed prior to the suppressor column. Otherwise, the capacity of the suppressor column would be used up too quickly in stripping the eluent.

EXAMPLE 2

Preparation of 0.0075 Micron Diameter Polyvinyl Benzyl Chloride Latex

Formulation

This formula and procedure will produce a partially crosslinked vinyl benzyl chloride polymer latex of estimated 75 Å diameter suitable for ion chromatography:

Aerosol A-103 (American Cyanamid): 0.93%
Sodium Bicarbonate (as 5% water solution): 0.40%
Potassium persulfate (as 5% water solution): 0.40%
Organic monomer phase: 1.00%
Sodium Pyrosulfite (metabisulfite) (as 5% water solution): 0.27%
Deionized water: 96.97%
Surfynol 104 (Air Products): 0.03%

The Aerosol A-103, bicarbonate, persulfate, Surfynol 104 and water are added to a suitable vessel, mixed until uniform and clear, purged of oxygen by bubbling nitrogen through the solution for 5-10 minutes and cooled in an ice bath. (NOTE: The cooling steps may not be necessary. In one experiment using this formula, the cooling step was eliminated and the resulting latex appeared the same as that obtained when cooling was carried out.) Cold, pre-mixed organic monomer phase is then added to the aqueous phase and nitrogen purging continued for an addition 5-10 minutes, after which the pyrosulfite is added. The nitrogen purge is continued 2-3 minutes more, then the reaction vessel is capped and mildly tumble-agitated for 20-24 hours at 30° C. The organic monomer phase is 95% vinyl benzyl chloride, 4.33% of impure (57% active) divinyl benzene, and 0.67% n-hexadecane. Small variations in the monomer (vinyl benzyl chloride) to crosslinker (divinyl benzene) ratio seem to have little effect on the particle size of the resulting latex. The resulting latex is then aminated in a conventional manner.

EXAMPLE 3

In this experiment the size of the latex was reduced to 0.0075 microns, as illustrated by a K' sulfate value of 0.05, in comparison to a normalized control K' sulfate value of 1.0, wherein the control latex had a median diameter of 0.15 microns. The sulfate retention time for the latex was 1.1 minutes, indicative of a low enough capacity so that the substrate size could be reduced, and the corresponding increase in capacity would be within acceptable levels.

EXAMPLE 4

In this example, the substrate size was decreased to 10 microns, plus or minus 1 micron. The size of the layering particles in the latex was 0.075. The same sample and eluent was used.

The results of the run was as follows. The efficiency of the resin was substantially increased in comparison to the 25 micron substrate resin. Thus, for example, depending upon the packing flow rate during formation of the column, the efficiency of the column varied from 9660 and 12,500 number of plates/meter for sulfate. Also, the sulfate retention time in the column was about 3.2 minutes, totally within the acceptable limits of capacity for ion chromatography.

The net result of using this type of resin is that the efficiency of the column can be varied to the desired range without causing an unacceptable corresponding increase in column capacity for ion chromatography.

What is claimed is:

1. An ion exchange composition comprising synthetic resin support particles with ion exchange sites at their exposed surfaces, and fine synthetic resin layering particles with ion exchange sites on their exposed surfaces which attract the ion exchange sites of said support particles so that said layering particles are irreversibly attached as a monolayer to said support particles, said layering particles having a median diameter ranging from 0.002 to 0.08 micron, the ratio of median diameter of support particles to layering particles ranging between 100 to 1 and 5000 to 1.

2. The composition of claim 1 in which the median diameter of said layering particles ranges from 0.007 to 0.05 microns.

3. The composition of claim 1 in which the ratio of median diameter of support particles to layering particles ranges between 200 to 1 and 2000 to 1.

4. The composition of claim 1 in which the median diameter of said substrate particles ranges from 3 microns to 100 microns.

5. The composition of claim 1 in which the median diameter of said substrate particles ranges from 3 microns to 25 microns.

6. The composition of claim 1 in a packed chromatographic column.

* * * * *